(12) United States Patent
Koyama

(10) Patent No.: US 6,316,760 B1
(45) Date of Patent: Nov. 13, 2001

(54) SOLID-STATE IMAGING APPARATUS

(75) Inventor: Eiji Koyama, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/354,181

(22) Filed: Jul. 16, 1999

(30) Foreign Application Priority Data

Jul. 17, 1998 (JP) .................................................. 10-204072

(51) Int. Cl.[7] ............................... H01L 27/00; H01N 3/14
(52) U.S. Cl. ....................................... 250/208.1; 348/294
(58) Field of Search .......................... 250/208.1, 214 R, 250/214.1; 348/294, 302, 303, 304, 311; 257/229, 291, 292, 443

(56) References Cited

U.S. PATENT DOCUMENTS 5,990,951 * 11/1999 Koyama ................................. 348/302

FOREIGN PATENT DOCUMENTS 9-130681    5/1997    (JP) .

* cited by examiner

*Primary Examiner*—John R. Lee
*Assistant Examiner*—Kevin Pyu
(74) *Attorney, Agent, or Firm*—Dike, Bronstein, et al.; David G. Conlin

(57) ABSTRACT

The solid-state imaging apparatus of this invention includes a voltage generation circuit including a transistor having a same device structure as the reset transistor and fabricated on a same substrate as the reset transistor, a gate of the transistor constituting the voltage generation circuit being commonly connected with a gate of the reset transistor, the voltage generation circuit generating the discharge potential to be applied to the reset transistor, wherein the voltage generation circuit includes a holding circuit for holding a potential at a source of the transistor constituting the voltage generation circuit in a level higher than a channel potential below the gate of the transistor constituting the voltage generation circuit.

3 Claims, 13 Drawing Sheets

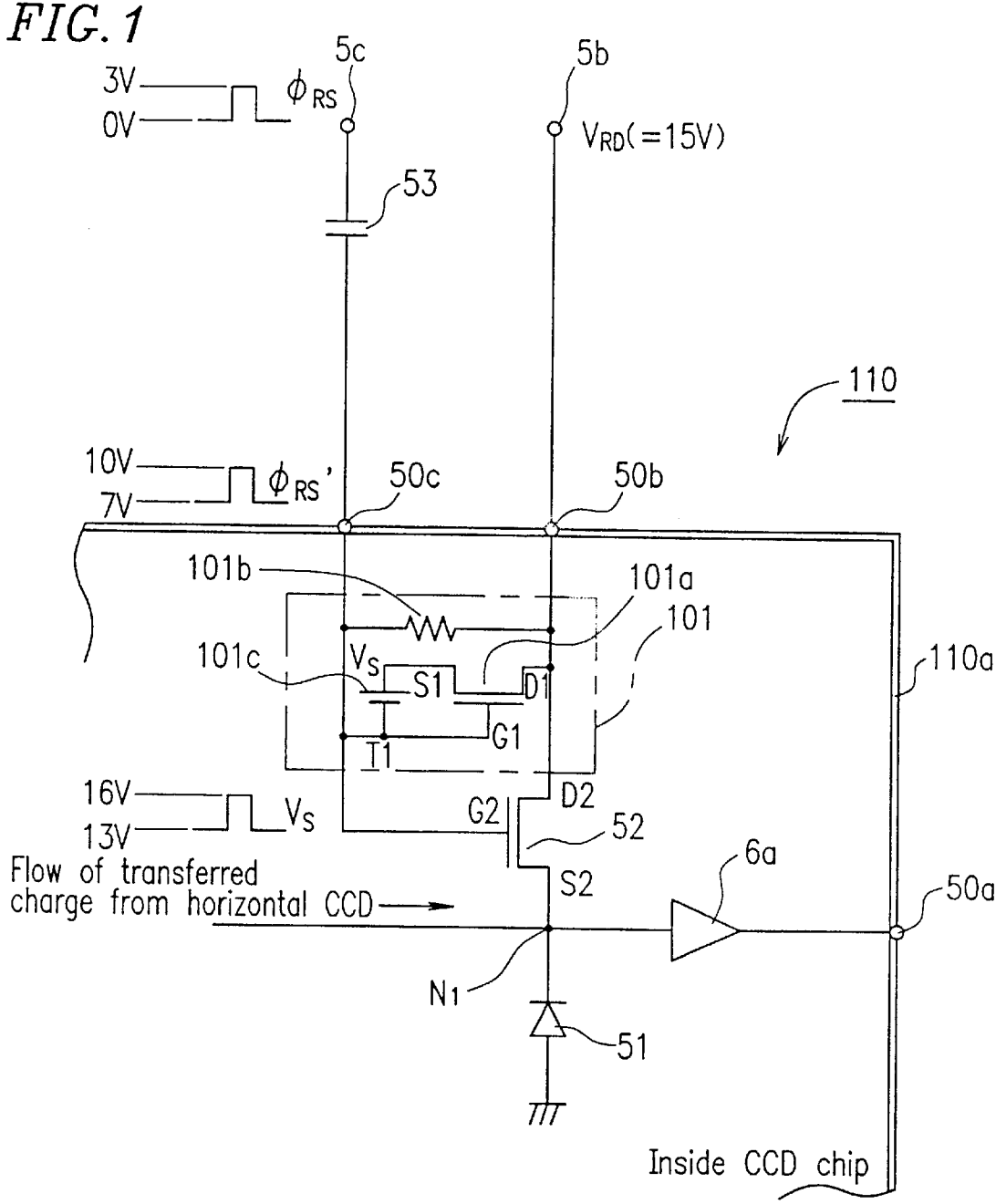

PRIOR ART

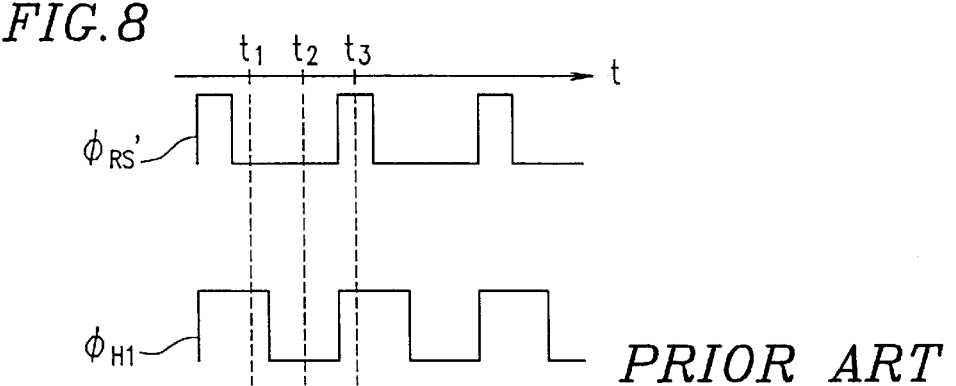
FIG. 8 *PRIOR ART*
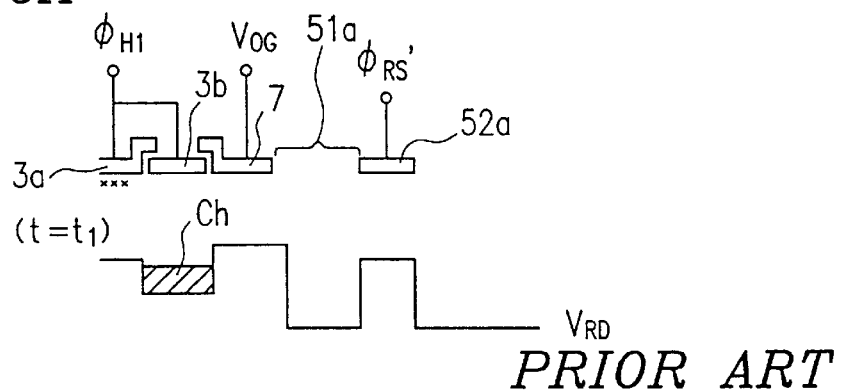
FIG. 9A *PRIOR ART*
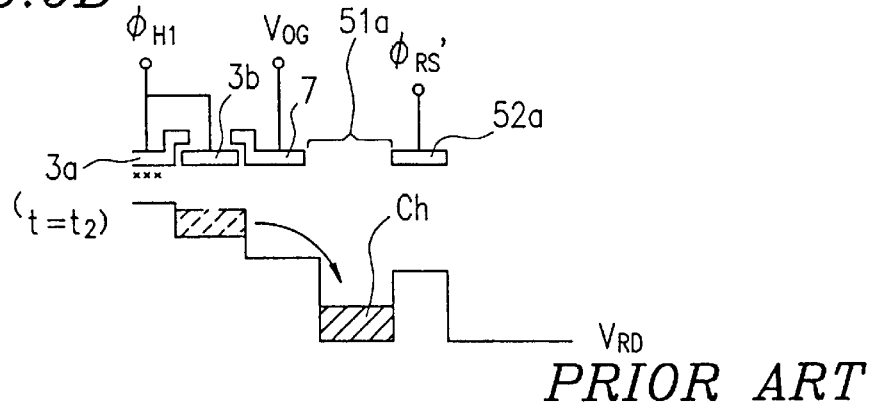
FIG. 9B *PRIOR ART*
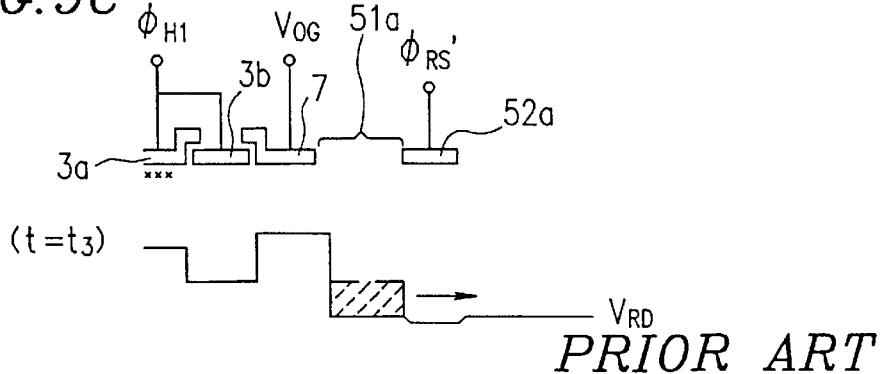
FIG. 9C *PRIOR ART*

*PRIOR ART*

PRIOR ART

PRIOR ART

Flow of transferred charge from horizontal CCD →

Inside CCD chip

PRIOR ART

SOLID-STATE IMAGING APPARATUS

BACKGROUND OF THE INVENTION

1. Field of the Invention

The present invention relates to a solid-state imaging apparatus applied to a video camera, a monitor camera, and the like. More particularly, the present invention relates to a solid-state imaging device utilizing a charge transfer function.

2. Description of the Related Art

Solid-state imaging apparatuses are applied to camera systems such as video cameras, monitor cameras, cameras at doors for monitoring visitors, car cameras, cameras for TV phones, cameras for multimedia use, and the like. In recent years, reduction of the size, weight, applied voltage, and cost of such solid-state imaging apparatuses have been requested. In order to realize these requests, the solid-state imaging apparatus generally uses a charge coupled device (CCD). The CCD converts transferred charges into voltages in a potential-floating diffusion layer called a floating diode, and outputs the voltages to an output circuit while sweeping the waste charges used in the charge-voltage conversion processing out to a reset drain. This sweeping of waste charges is realized by applying a reset gate clock to a reset transistor.

FIGS. 7A and 7B illustrate a conventional solid-state imaging apparatus 200: FIG. 7A is a plan view illustrating a CCD imaging section of the solid-state imaging apparatus 200; and FIG. 7B is a view illustrating a circuit construction of a charge-voltage conversion portion and the vicinity thereof of the CCD imaging section.

Referring to FIGS. 7A and 7B, the conventional solid-state imaging apparatus 200 includes a CCD chip 200a which has a function of resolving light from an object to be imaged for each pixel to perform photoelectric conversion and transferring light charges generated by the photoelectric conversion. The CCD chip 200a includes a plurality of photodiodes 1 arranged in a matrix on an n-type substrate 10, vertical CCDs 2, and a horizontal CCD 3. The photodiodes 1 convert incident light to electric charges by photoelectric conversion and accumulate the charges generated by the photoelectric conversion. The vertical CCDs 2 are disposed to correspond to respective columns of photodiodes 1, and transfer the accumulated charges in the vertical direction. The horizontal CCD 3 transfers the charges transferred from the vertical CCDs 2 in the horizontal direction. A charge-voltage conversion section 5 is disposed downstream of the horizontal CCD 3 for converting the charges transferred from the horizontal CCD 3 to voltages. An output circuit 6 is disposed downstream of the charge-voltage conversion section 5. The output circuit 6 has a source follower structure normally composed of a plurality of stages and serves to decrease an output impedance.

A transfer gate 4 is also provided between each photodiode 1 and the vertical CCD 2 for transferring the charges accumulated in the photodiode 1 to the vertical CCD 2.

The charge-voltage conversion section 5, which is formed on the substrate, includes: a floating diode 51 having a charge accumulation region N1 which accumulates charges transferred from the horizontal CCD 3 and is in a potential-floating state; and a reset transistor 52 for draining the charges accumulated in the charge accumulation region N1. The potential value at the charge accumulation region N1 changes depending on the a mount of accumulated charges. An amplifier 6a which constitutes the output circuit 6 amplifies the potential value and outputs an imaging signal to a signal output terminal 50a of the CCD imaging section.

The source of the reset transistor 52 is connected to the charge accumulation region N1, the gate thereof is connected to a signal terminal 50c to which a reset gate Pulse $\phi_{RS}$ is applied, and the drain thereof is connected to a signal terminal 50b to which a reset drain voltage (voltage for charge drain) $V_{RD}$ is applied. The signal terminal 50c is connected to a supply source 5c of the reset gate pulse $\phi_{RS}$, and the signal terminal 50b is connected to a supply source 5b of the reset drain voltage $V_{RD}$.

Partial potential resistors R1 and R2 are connected in series between the supply source 5b of the reset drain voltage $V_{RD}$ and the ground, so that a DC bias voltage $V_{BS}$ is generated at the connection point of these resistors. A diode 54 is connected between the connection point of these resistors and the signal terminal 50c so that the forward direction is the direction from the connection point toward the signal terminal 50c.

The reset drain voltage $V_{RD}$ is a DC voltage of, for example, 15 V. The gate of the reset transistor 52 is normally applied with a gate application pulse $\phi_{RS}'$ obtained by superimposing the DC bias voltage $V_{BS}$ on the reset gate clock $\phi_{RS}$ which is normally driven at 0 V to 5 V.

FIG. 12 shows the voltage relationship between the reset gate clock $\phi_{RS}$ and the gate application pulse $\phi_{RS}'$. For example, under the conditions of $V_{RD}$=15 V, R1=10 kΩ, and R2=20 kΩ, $V_{BS}$ is 10 V. Under these conditions, assuming that the high level and low level of the reset gate clock $\phi_{RS}$ are 5 V and 0 V, respectively, and the forward voltage of the diode 54 is −0.5 V, the amplitude of the gate application pulse $\phi_{RS}'$ is from 9.5 V to 14.5 V.

The resistors R1 and R2 and the diode 54 are disposed externally although it is basically possible to mount these components on the chip, for the following reasons. In the case of on-chip formation, the resistors will be constructed so that the internal voltage $V_{BS}$ be generated by dividing the resistance of a low-concentration diffusion layer in consideration of current consumption. In this case, if the concentration of the diffusion layer varies during the fabrication process, the value of the internal voltage $V_{BS}$ also varies. As for the diode, if the diode is attempted to be formed on the CCD chip, the process becomes complicated because, while the diode is formed by a bipolar process, the CCD chip is basically formed by a MOS process. It is possible to form a transistor in place of the diode. In this case, however, the value of the internal voltage $V_{BS}$ still changes due to a variation in fabrication process.

Referring to FIGS. 8 and 9A to 9C, the operation of sweeping waste charges out from the charge accumulation region after charge-voltage conversion will be described. FIG. 8 shows a timing of a gate clock pulse $\phi_{H1}$ for the horizontal CCD 3 and the gate application pulse $\phi_{RS}'$ for the reset transistor 52 used during the operation of sweeping waste charges. FIGS. 9A to 9C illustrate potential states in a portion ranging from the downstream end of the horizontal CCD 3 to the reset transistor 52, at times t=$t_1$, t=$t_2$, and t=$t_3$ indicated in FIG. 8, respectively.

In FIGS. 9A to 9C, the gate clock pulse $\phi_{H1}$ is applied to two adjacent horizontal transfer gates 3a and 3b. In general, two adjacent horizontal transfer gates of the horizontal CCD are located on different semiconductor regions discriminated from each other by ion implantation so as to provide a potential gradient. In this case, boron is implanted in the semiconductor region underlying the horizontal transfer gate 3a. An output gate 7 is located near the horizontal transfer gate 3b. A constant DC voltage $V_{OG}$ is applied to the output gate 7. A charge accumulation region 51a of the floating diode is located between the output gate 7 and a gate 52a of the reset transistor 52.

A charge Ch accumulated in the horizontal CCD 3 at $t=t_1$ is transferred to the diffusion layer (charge accumulation region) 51a called a floating diode, which is in a potential-floating state at $t=t_2$ via the output gate 7 to which the DC voltage $V_{OG}$ of about 1 V to 2 V is applied. The potential at the floating diode varies depending on the amount of the transferred charge, and the variation of the potential is output to the output circuit 6. Thereafter, at $t=t_3$, the waste charge is swept out to the reset drain. At this time, the potential at the floating diffusion layer 51a is also fixed to the reset drain voltage $V_{RD}$.

The DC bias voltage $V_{BS}$ superimposed on the reset gate clock $\phi_{RS}$, which constitutes the low level of the gate application pulse $\phi_{RS}'$, is set so that the reset transistor 52 is turned on at the time of reset, i.e., when the reset gate clock $\phi_{RS}$ becomes a high level.

For example, assuming that the reset drain voltage $V_{RD}$ is 15 V, and the voltage level of the gate application pulse $\phi_{RS}'$ for turning on the reset transistor 52 is Vt, the level required as the DC bias voltage $V_{BS}$ is (Vt−5.0)V when the amplitude of the reset gate clock $\phi_{RS}$ is from 0 V to 5.0 V. The DC bias voltage $V_{BS}$ is determined by the level of the reset drain voltage $V_{RD}$ and the properties of the reset transistor 52, such as the threshold of the transistor and the effect of the substrate on the transistor.

Actually, however, the supply voltage and the properties of the transistor 52 vary. Therefore, a value including such variations is normally selected as the DC bias voltage $V_{BS}$ to be superimposed, so as to ensure the reset operation. Specifically, the DC bias voltage to be superimposed is often set at a value higher than the above value (Vt−5.0)V by about 1 V.

FIGS. 10A to 10D illustrate the potential levels at a floating diode (FD) section, a reset gate (RG) section, and a reset drain (RD) section in the state where no charge is accumulated. The FD section corresponds to the charge accumulation region constituting the floating diode 51, the RG section corresponds to the region below the gate of the reset transistor 52, i.e., a channel region, and the RD section corresponds to the drain region of the reset transistor 52. In FIGS. 10A to 10D, P($\phi_{RS}'$L) denotes a potential level at the RG section when the gate application pulse $\phi_{RS}'$ is in the low level, P($\phi_{RS}'$H) denotes a potential level at the RG section when the gate application pulse $\phi_{RS}'$ is in the high level, and P($V_{RD}$) denotes a potential level at the RD section to which the reset drain voltage $V_{RD}$ is being applied.

FIG. 10A illustrates an ideal case, where the high level of the gate application pulse $\phi_{RS}'$ should be such a voltage level that, when this voltage is applied to the gate 52a of the reset transistor 52, the potential level at the reset gate (RG) section is just matched with the potential level at the reset drain (RD) section to which the reset drain voltage $V_{RD}$ is applied.

When the reset drain voltage $V_{RD}$ supplied externally is varied on the increase side by $\Delta V_1$ as shown in FIG. 10B, the potential levels at the floating diode (FD) section and the reset drain (RD) section increase, resulting in a failure to completely sweep the waste charge although the high level of the gate application pulse $\phi_{RS}'$ applied to the gate 52a of the reset transistor 52 is kept unchanged.

When the threshold Vt of the reset transistor 52 increases due to a variation in fabrication process as shown in FIG. 10C, the channel potential decreases by $\Delta V_2$ with respect to the ideal state although the voltage applied at the gate of the reset transistor 52 is kept unchanged. This causes a reset failure in which the waste charge cannot be completely swept, resulting in degradation of image quality.

In order to avoid such degradation of image quality, the variation in the reset drain voltage $V_{RD}$ and the variation in the threshold Vt of the transistor 52 due to a variation in fabrication process are taken into consideration in setting the DC bias voltage $V_{BS}$ superimposed on the reset gate pulse $\phi_{RS}$. That is, the DC bias voltage $V_{BS}$ is set so that the potential is higher than the ideal case by about 1 V to compensate $\Delta V_1+\Delta V_2$. FIG. 10D illustrates the potential levels at the FD section, the RG section, and the RD section observed when the above setting is performed. The DC bias voltage $V_{BS}$ set as described above is actually about 1 V higher than the ideal case although it depends on the process conditions.

However, if the reset drain voltage $V_{RD}$ is varied on the decrease side and the threshold Vt of the reset transistor 52 decreases due to a variation in fabrication process under the above conditions, the accumulable charge amount in the floating diode (FD) section decreases.

FIGS. 11A and 11B are views illustrating the accumulable charge amounts in the floating diode (FD) section: FIG. 11A illustrates the accumulable charge amount in the case where the DC bias voltage $V_{BS}$ is set to be higher by about 1 V than the ideal case. FIG. 11B illustrates the accumulable charge amount in the case where the DC bias voltage $V_{BS}$ is set to be higher by about 1 V than the ideal case and moreover the reset drain voltage $V_{RD}$ is varied on the decrease side, while the threshold Vt decreases, providing a total variation of about 1 V.

In general, as the DC bias voltage $V_{BS}$ is increased to prevent reset failure, the accumulable charge amount in the FD section is decreased since the accumulable charge amount is limited by the low level of the gate application pulse $\phi_{RS}'$.

When the above accumulable charge amount in the FD section is considered, together with the variation in supply voltage and the variation in fabrication process, a loss of the voltage amplitude of about 2 V at maximum is generated. This is equivalent to applying a pulse having an amplitude of 3 V as the gate application pulse $\phi_{RS}'$ in the ideal case.

Thus, the conventional solid-state imaging apparatus described above has the following problem. Although the amplitude of the gate application pulse to be applied to the reset transistor is 5 V, the actual effective amplitude of the gate application pulse is decreased to about 3 V due to a variation in the supply voltage connected to the drain of the reset transistor and a variation in the fabrication process for the reset transistor. This means, in reverse, that in the ideal state the reset operation requires only 3 V amplitude of the gate application pulse. However, since this ideal state cannot be realized stably, an amplitude of 5 V is required to be set as the gate application pulse.

Japanese Laid-Open Publication No. 4-360544 discloses a charge detection apparatus which can be normally operated only by continually supplying a binary pulse externally even if the channel potential of a reset transistor varies due to a variation in fabrication process (conventional example 2).

FIG. 13A illustrates a circuit construction of a charge detection apparatus 210 of the conventional example 2. FIGS. 13B and 13C illustrate the potential at the reset drain (RD) section and a channel potential during application of the gate application pulse $\phi_{RS}'$. FIG. 13B shows the case where the channel potential is not varied due to a variation in fabrication process, and FIG. 13C shows the case where the channel potential is varied due to a variation in fabrication process.

A voltage generation circuit 201 includes: a voltage generation transistor 201a having a terminal connected to the input terminal 50b of a drain application voltage and a gate to which a DC voltage $V_{ref}$ is applied; an inverted amplifier 201b of which input is connected to another terminal of the transistor 201a; and a diode 201c connected between the output of the inverted amplifier 201b and the input terminal 50c for the reset gate clock. The voltage generation transistor 201a is fabricated in the same process as the reset transistor 52 and has the same construction as the reset transistor 52.

In the apparatus 210 with the above construction, the DC voltage $V_{ref}$ is set so that, when the gate application pulse $\phi_{RS}'$ is in a high level, DC bias voltages $V_{BS}$ and $V_{BS}'$ are generated on the input side and the output side of the inverted amplifier 201b, respectively. The DC bias voltages $V_{BS}$ and $V_{BS}'$ should be high enough for the transistor 201a having a drain to which the voltage $V_{RD}$ is applied to be turned on. In this state, as shown in FIG. 13B, the channel potential $P(\phi_{RS}'H)$ obtained when the gate application pulse $\phi_{RS}'$ is in the high level is matched with the potential $P(V_{RD})$ at the drain region of the reset transistor 52.

In this conventional case, when the channel potential of the reset transistor 52 is increased by $\Delta P$ due to a process variation (see FIG. 13C), the channel potential at the voltage generation transistor 201a is also increased by $\Delta P$, and thus the DC bias voltage $V_{BS}$ on the input side of the inverted amplifier 201b is increased by $\Delta V_{BS}$ corresponding to the potential increase $\Delta P$.

In the above case, the output voltage $V_{BS}'$ of the inverted amplifier 201b is decreased by a value corresponding to $\Delta V_{BS}$, and thus the voltage level of the gate application pulse $\phi_{RS}'$ is decreased, resulting in canceling the variation $\Delta P$ of the channel potential.

The above conventional example 2 has the following problem. A variation is generated in the channel potential of the voltage generation transistor 201a due to a variation in fabrication process, as in the reset transistor 52, causing a variation in the output voltage $V_{BS}$ of the voltage generation transistor 201a. However, the direction of the variation in the output voltage $V_{BS}$ is reverse to the direction of the change in the voltage applied to the gate of the reset transistor 52 for canceling the variation in the channel potential at the reset transistor 52. An inverted amplifier is therefore required for inverting the output voltage $V_{BS}$. Having the inverted amplifier, it becomes necessary to additionally consider a variation in the characteristics of the inverted amplifier.

Japanese Laid-Open Publication No. 6-133227 discloses a charge transfer apparatus having a voltage generation circuit incorporated in a CCD chip (conventional example 3).

FIG. 14A illustrates a circuit construction of a charge transfer apparatus 220 of the conventional example 3. FIGS. 14B and 14C illustrate the potential at the reset drain (RD) section and a channel potential during application of the gate application pulse $\phi_{RS}'$. FIG. 14B shows the case where the channel potential is not varied due to a variation in fabrication process, and FIG. 14C shows the case where the channel potential is varied due to a variation in fabrication process.

The difference in construction of the conventional example 3 from the conventional example 1 shown in FIGS. 7A and 7B is as follows. A voltage generation transistor 202a is connected between the reset transistor 52 and the input terminal 50b for the drain application voltage, so as to incorporate a voltage generation circuit 202 for generating a drain voltage for the reset transistor 52 in a CCD chip 220a. The voltage generation transistor 202a is fabricated in the same process as the reset transistor 52 and have the same construction as the reset transistor 52.

With the above construction, an output voltage $V_{RD}'$ of the voltage generation circuit 202 is lower than the reset drain voltage $V_{RD}$ supplied externally by a threshold $Vt(V_{RD})$ of the transistor 202a.

The level of the DC bias voltage $V_{BS}$ to be superimposed on the reset gate clock $\phi_{RS}$ is set in the above state. Although the publication which discloses the conventional example 3 mentions no generation circuit for the DC bias voltage $V_{BS}$, it is clear from the technical aspect of the publication that a generation circuit for DC bias voltage $V_{BS}$ is necessary.

When the channel potential of the reset transistor 52 is increased by $\Delta P$ due to a process variation, the potential $P(V_{RD}')$ at the drain region of the reset transistor 52 is also increased by $\Delta P$.

In the conventional example 3, therefore, even if the channel potential of the reset transistor 52 is varied due to a process variation, the difference between the potential at the drain region of the reset transistor 52 and the channel potential of the reset transistor 52 during application of the high-level and low-level gate application pulse $\phi_{RS}'$ can be fixed.

One problem of the above conventional example 3 is that the $V_{BS}$ generation circuit is additionally required. Another problem is as follows. The conventional example 3 describes that the potential at the source region of the voltage generation transistor 202a is the same as the channel potential below the gate of the transistor 202a. However, since the diffusion layer constituting the source region is in the potential-floating state, it finally falls in the same potential as that at the diffusion layer constituting the drain region at which the potential is fixed by an external source, during the thermionic emission. To avoid this, some measures must be taken to keep the potential at the source region identical to the channel potential.

As one of the measures, Japanese Laid-Open Publication No. 6-153086 discloses a method in which a charge is periodically supplied from an external source, i.e., through the drain region to the source region, during a time period when the output from a CCD is unnecessary (e.g., during a horizontal return period), so that the potential at the source region is made identical to the channel potential (conventional example 4).

Japanese Laid-Open Publication No. 9-130681 discloses a solid-state imaging apparatus which integrally overcomes the problems arising in the above conventional examples 1 to 4 (conventional example 5). As shown in FIG. 15, the conventional solid-state imaging apparatus of the conventional example 5 includes a pulse generation circuit 203 incorporated in a CCD chip 230a, in place of the diode 54 for generating the DC bias voltage $V_{BS}$ and the resistors $R_1$ and $R_2$ in the solid-state imaging apparatus 200 of the conventional example 1. The pulse generation circuit 203 receives the reset gate clock $\phi_{RS}$ and generates the gate application pulse $\phi_{RS}'$. The other construction of the solid-state imaging apparatus 230 is the same as that of the solid-state imaging apparatus 200 of the conventional example 1.

The pulse generation circuit 203 includes: a voltage generation transistor 203a of which a drain D1 is connected to a drain D2 of the reset transistor 52 and a source S1 and a gate G1 are connected to a gate G2 of the reset transistor 52; and a resistor 203b connected between the drain D2 and the gate G2 of the reset transistor 52.

The above construction realizes the ideal state shown in FIG. 10A in the conventional example 1, in which the pulse amplitude of 5 V of the reset clock pulse conventionally required can be reduced to about 3 V, thereby enabling low voltage and low power consumption. Also, in this construction, a generation circuit for the DC bias voltage $V_{BS}$ to be superimposed on the reset pulse, which is conventionally required to be disposed outside the CCD chip, is not necessary, thereby enabling reduction in the number of peripheral components and thus reduction in the size, weight, and cost of the apparatus.

However, the conventional example 5 has the following problem. The transistor in the pulse generation circuit 203 incorporated in the CCD chip has such a structure that the gate and the source are short-circuited. Accordingly, in order to prevent short-circuiting between the drain and the source, the transistor needs to be an n-channel type in which the channel potential below the gate is lower than the gate voltage. Therefore, the conventional example 5 is not applicable to apparatuses in which the channel potential of the transistor is higher than the gate voltage thereof.

SUMMARY OF THE INVENTION

The solid-state imaging apparatus of this invention includes: photodiodes having a photoelectric conversion function arranged on a substrate in one of a one-dimensional manner and a two-dimensional manner; a charge transfer section for transferring a charge generated by photoelectric conversion in each of the photodiodes; a charge accumulation section in a potential-floating state for accumulating the charges transferred from the charge transfer section; a reset transistor having one terminal connected to the charge accumulation section and another terminal being applied with a discharge potential, for outputting the transferred charges; and a voltage generation circuit including a transistor having a same device structure as the reset transistor and fabricated on a same substrate as the reset transistor, a gate of the transistor constituting the voltage generation circuit being commonly connected with a gate of the reset transistor, the voltage generation circuit generating the discharge potential to be applied to the reset transistor, wherein the voltage generation circuit includes a holding circuit for holding a potential at a source of the transistor constituting the voltage generation circuit in a level higher than a channel potential below the gate of the transistor constituting the voltage generation circuit.

In one embodiment of the invention, the holding circuit includes a voltage source disposed between the gate and the source of the transistor constituting the voltage generation circuit.

In another embodiment of the invention, the holding circuit includes a voltage drop circuit including a plurality of transistors each having a gate and a source short-circuited therebetween, disposed between the gate and a source of the transistor constituting the voltage generation circuit.

Thus, according to the present invention, the voltage generation circuit for generating a discharge potential to be applied to the reset transistor includes a transistor which has the same structure as the reset transistor and is fabricated on the same substrate as the reset transistor. Therefore, the two transistors have substantially the same characteristics, and thus an influence of a variation component caused by the device characteristics can be reduced.

The gate of the transistor constituting the voltage generation circuit is commonly connected with the gate of the reset transistor. Accordingly, when the channel potential at the reset transistor is varied due to a variation in fabrication process, the channel potential at the transistor constituting the voltage generation circuit is also varied in the same manner. Thus, the gate application voltage applied to the reset transistor is changed so as to compensate the variation in the channel potential at the reset transistor. Also, when the external power supply connected to the drain of the reset transistor is varied, a pulse raised by a value corresponding to the variation in potential at the external power supply can be applied to the gate of the reset transistor. This eliminates an influence of a potential variation in the external power supply.

Thus, by eliminating an unnecessary margin of the gate application voltage for the reset transistor, the amplitude of the gate application voltage can be reduced to realize low voltage application.

Moreover, the holding circuit holds the source potential at the transistor constituting the voltage generation circuit at a level higher than the channel potential below the gate of the transistor. Thus, even when the channel potential at this transistor is higher than the gate potential, short-circuiting between the drain and source of the transistor can be prevented. This eliminates the necessity of limiting the transistor constituting the voltage generation circuit to a specific one.

Thus, the invention described herein makes possible the advantage of providing a solid-state imaging apparatus which is less influenced by a variation in supply voltage and a variation in threshold due to a variation in the process of fabricating a reset transistor, can reduce the amplitude of a gate application voltage for the reset transistor to achieve low voltage application, and has a reset gate clock generation circuit including a transistor at which the channel potential can be higher than the gate voltage.

These and other advantages of the present invention will become apparent to those skilled in the art upon reading and understanding the following detailed description with reference to the accompanying figures.

BRIEF DESCRIPTION OF THE DRAWINGS

FIG. 1 is a view illustrating a construction of a solid-state imaging apparatus of Example 1 according to the present invention;

FIG. 8 is a view illustrating a pulse timing of reset operation of the solid-state imaging apparatus of the conventional example 1;

FIGS. 9A to 9C are views illustrating a change in potential during the reset operation of the solid-state imaging apparatus of the conventional example 1, showing the potential states at times t=t$_1$, t=t$_2$, and t=t$_3$, respectively;

FIGS. 10A to 10D are views illustrating potential levels at the floating diode (FD) section, the reset gate (RG) section, and the reset drain (RD) section in the state where no charge is accumulated in the solid-state imaging apparatus of the conventional example 1, wherein FIG. 10A shows an ideal case, FIG. 10B shows the case where the externally supplied reset drain voltage V$_{RD}$ is varied, FIG. 10C shows the case where the threshold Vt of the reset transistor is varied due to a variation in fabrication process, and FIG. 10D shows the case where the DC bias voltage V$_{BS}$ is set in consideration of the variation in the reset drain voltage V$_{RD}$ and the variation in the threshold Vt of the reset transistor due to a variation in fabrication process;

FIGS. 11A and 11B are views illustrating the accumulable charge amounts in the floating diode (FD) section, wherein FIG. 11A shows the accumulable charge amount in the case where the DC bias voltage V$_{BS}$ is set to be higher than the ideal case by about 1 V, and FIG. 11B shows the accumulable charge amount in the case where the DC bias voltage V$_{BS}$ is set to be higher than the ideal case by about 1 V and moreover in the case where the reset drain voltage V$_{RD}$ is varied on the decrease side and the threshold Vt decreases providing a total variation of about 1 V;

FIGS. 13A to 13C are views illustrating the solid-state imaging apparatus of the conventional example 2, wherein FIG. 13A is a circuit construction view, and FIGS. 13B and 13C show the potential levels in the case where no variation in channel potential is generated due to a variation in fabrication process and in the case where a variation in channel potential is generated due to a variation in fabrication process, respectively;

FIGS. 14A to 14C are views illustrating the solid-state imaging apparatus of the conventional example 3, wherein FIG. 14A is a circuit construction view, and FIGS. 14B and 14C show the potential levels in the case where no variation in channel potential is generated due to a variation in fabrication process and in the case where a variation in channel potential is generated due to a variation in fabrication process, respectively.

DESCRIPTION OF THE PREFERRED EMBODIMENTS

Hereinafter, the present invention will be described by way of examples with reference to the accompanying drawings.

EXAMPLE 1

Figure 7A:
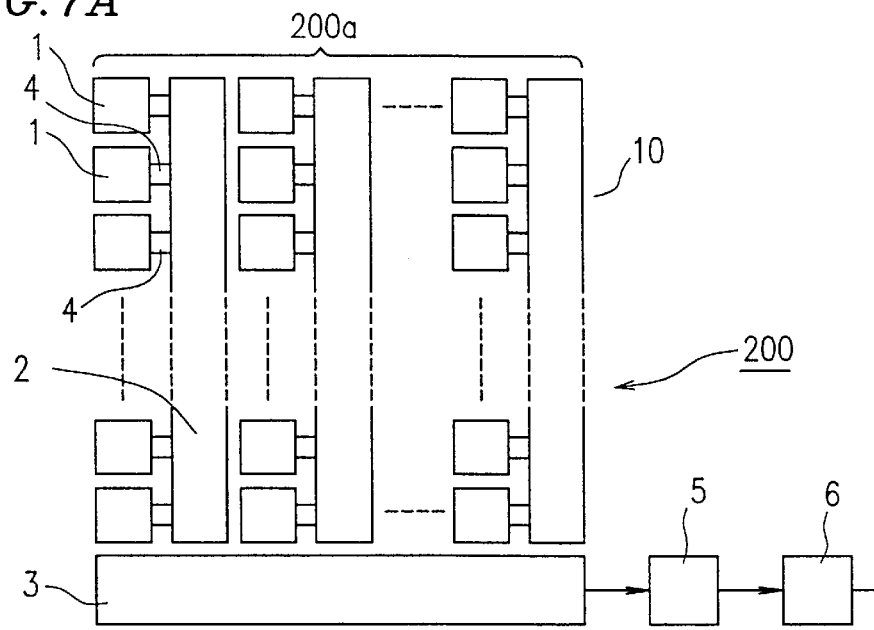
FIG. 7A is a plan view illustrating a construction of a CCD imaging section of the solid-state imaging apparatus of the conventional example 1.
Figure 7B:
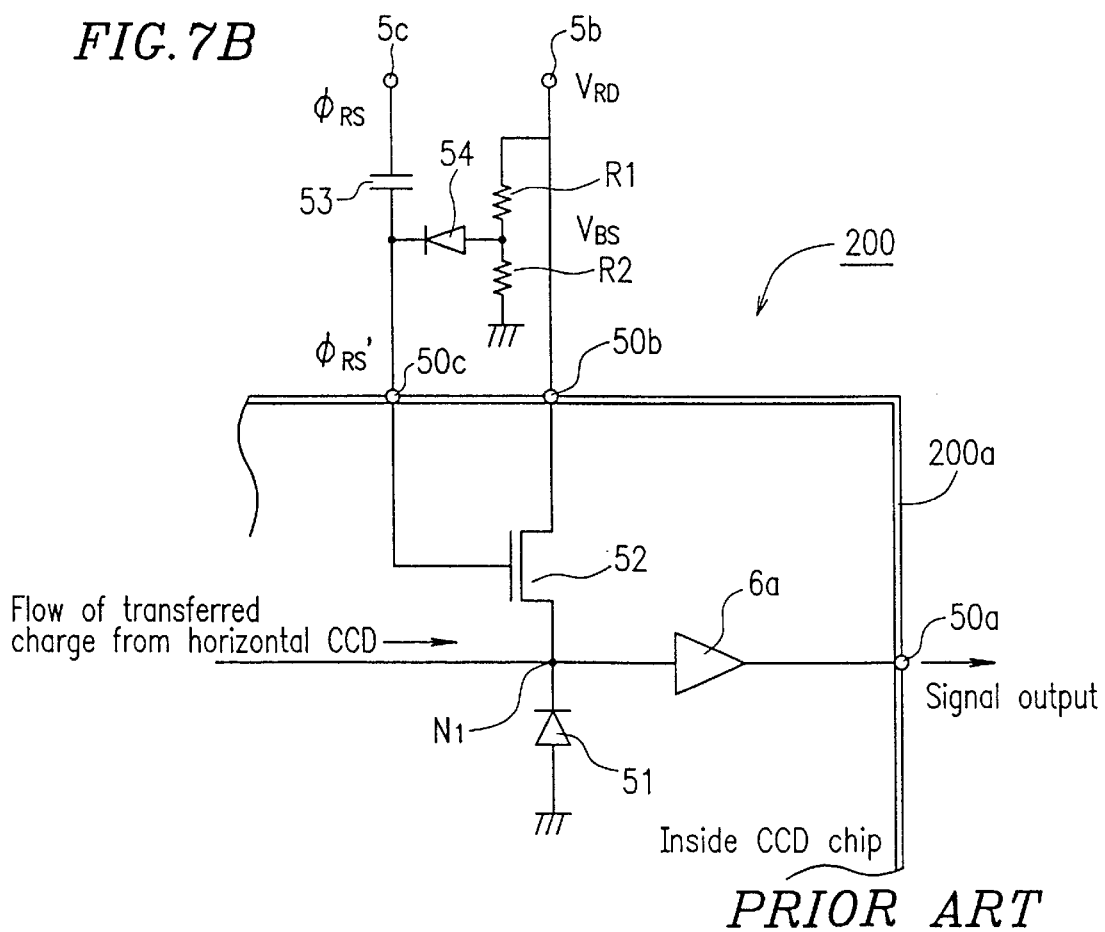
FIG. 7B is a view illustrating a circuit construction of a charge-voltage conversion portion and the vicinity thereof of the CCD imaging section.

FIG. 1 illustrates a construction of a solid-state imaging apparatus of Example 1 according to the present invention. Referring to FIG. 1, a solid-state imaging apparatus 110 of this example includes a pulse generation circuit 101 incorporated in a CCD chip 110a, in place of the diode 54 for generating the DC bias voltage V$_{BS}$ and the resistors R$_1$ and R$_2$ of the CCD imaging section 200 of the solid-state imaging apparatus of the conventional example 1 shown in FIG. 7B. The pulse generation circuit 101 receives the reset gate clock φ$_{RS}$ and generates a gate application pulse φ$_{RS}$'. The other construction of the solid-state apparatus of this example is the same as that of the solid-state imaging apparatus 200 of the conventional example 1.

The pulse generation circuit 101 includes a voltage generation transistor 101a, a resistor 101b, and a voltage source 101c for supplying a DC bias voltage. A drain D1 of the voltage generation transistor 110a is connected to a drain D2 of the reset transistor 52. A source S1 and a gate G1 of the voltage generation transistor 101a are connected to respective terminals of the voltage source 101c. The gate G1 is also connected to a gate G2 of the reset transistor 52. The resistor 101b is connected between the drain D2 and the gate G2 of the reset transistor 52.

The resistor 101b is disposed to turn on the voltage generation transistor 101a. In an initial state, the diode-connected voltage generation transistor 101a is reverse-biased, allowing a capacitor 53 to be charged. When the charged amount in the capacitor 53 exceeds a threshold, the voltage generation transistor 101a is turned on.

The transistor 101a is formed on a substrate on which the reset transistor 52 is also formed, and has the same device characteristics as those of the reset transistor 52. In a field effect transistor, in general, when the threshold obtained when both the source voltage and the drain voltage are 0 V is Vt, the threshold Vt increases as the source voltage and the drain voltage increase due to a substrate effect. Therefore, strictly, the threshold Vt obtained when the source voltage is V$_s$ is expressed by Vt(V$_s$) which is dependent on the source voltage V$_s$.

The threshold Vt of the voltage generation transistor 101a shown in FIG. 1 should have a condition of Vt(V$_{RD}$)≧0, but the condition of Vt(0)≧0 is not necessarily required. In other words, the voltage generation transistor 101a is only required to have the threshold Vt of a positive value in the operation state in which a voltage is being applied to the source S1, but it is not necessarily required to be of an enhancement type which satisfies the condition of Vt(0)≧0.

Figure 2A:
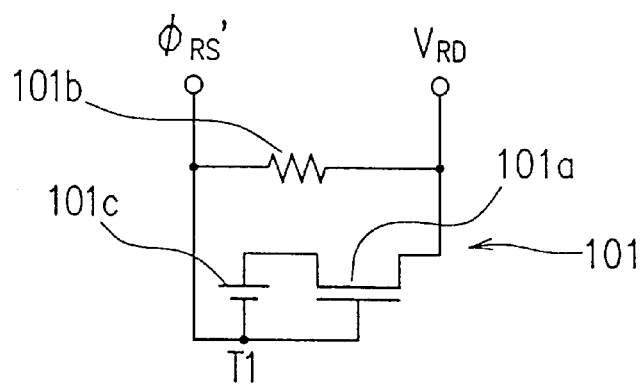
FIGS. 2A and 2B are views illustrating a voltage generation circuit constituting the solid-state imaging apparatus of Example 1 according to the present invention, and a circuit equivalent to the voltage generation circuit, respectively, for comparing these circuits.
Figure 2B:
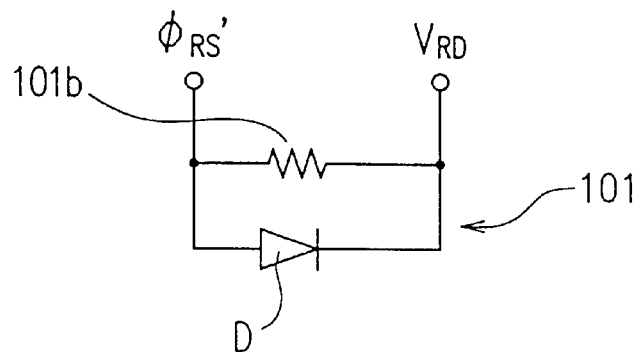

In the voltage generation transistor 101a, the source S1 and the gate G1 are connected to the respective terminals of the voltage source 101c for supplying the DC bias voltage so as to avoid short-circuiting between the drain D1 and the source S1. As shown in FIGS. 2A and 2B illustrating equivalent circuits of the pulse generation circuit 101, the voltage generation transistor 101a shown in FIG. 2A is equivalent to a diode D shown in FIG. 2B, wherein a terminal T1 serves as an anode and a drain terminal serves as a cathode.

Figure 3:
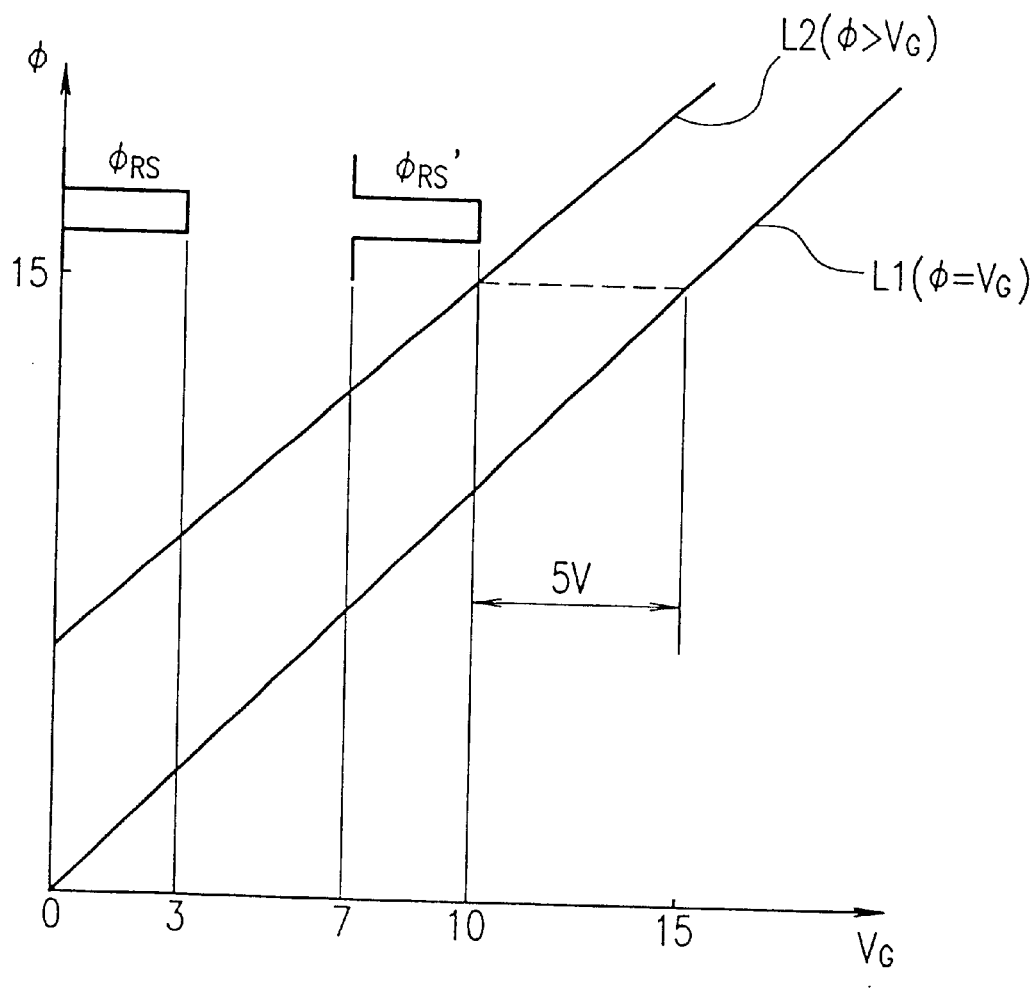
FIG. 3 is a graph illustrating the relationship between the gate voltage and the channel potential at a transistor of the solid-state imaging apparatus of Example 1 according to the present invention.

The DC voltage supplied by the voltage source 101c to be added to the source S1 is selected so that the potential of the source S1 is higher than the channel potential below the gate G1. FIG. 3 shows the relationship between the gate voltage V$_G$ of the gate G1 and the channel potential φ below the gate G1. The straight line L2 represents this relationship in the case of a transistor in which the channel potential φ is higher than the gate voltage V$_G$. In this case, since the channel potential φ is higher than the drain reset voltage $V_{RD}$ when the gate application pulse $\phi_{RS}'$ is in a high level, the high level of the gate application pulse $\phi_{RS}'$ is fixed to a value of the gate voltage $V_G$ corresponding to $\phi=V_{RD}$. For example, when the drain reset voltage $V_{RD}$ is 15 V, the high level of the gate application pulse $\phi_{RS}'$ is set at 10 V and the low level thereof is set at 7 V. In this case, therefore, the transistor is equivalent to a diode in which the drop voltage is 5 V, which is different from a drop voltage for a normal diode. Thus, the DC bias voltage to be added is merely required to be $V_{RD}-\phi_{RS}'$ (high level)=5 V or more.

Figure 4:
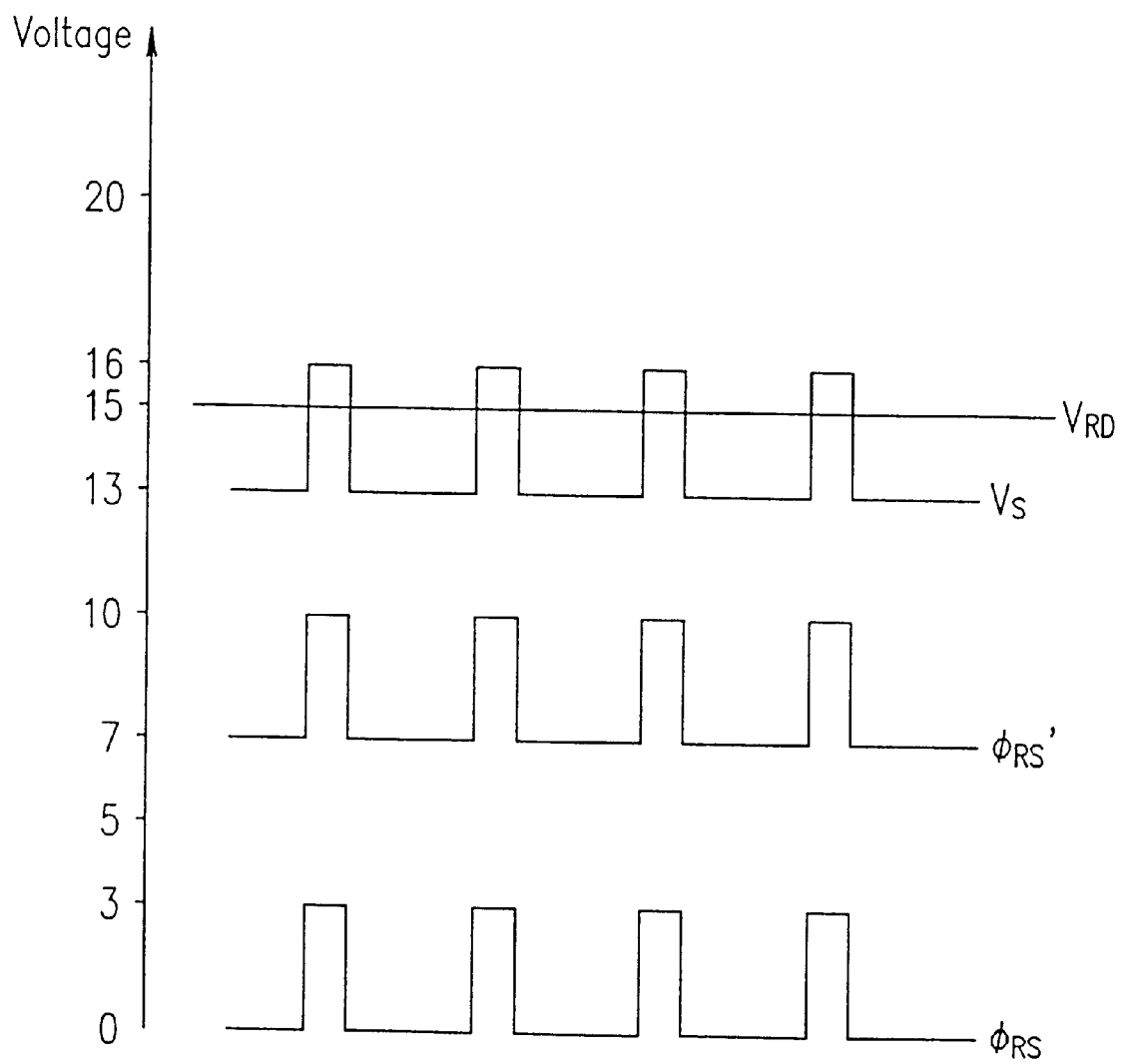
FIG. 4 is a view illustrating the voltage relationship among an external supply voltage $V_{RD}$, a reset gate clock $\phi_{RS}$, a gate application pulse $\phi_{RS}'$, and a source voltage $V_S$ of a source S1 of a transistor 101a in the solid-state imaging apparatus of Example 1 according to the present invention.

FIG. 4 shows a timing diagram in the case where the DC bias voltage to be added is 6 V. As is observed from FIG. 4, the voltage level of the gate application pulse $\phi_{RS}'$ is settled at the state where an ON current which flows toward the drain of the reset transistor when the voltage is in the high level is balanced with a leak current which flows from the drain when the voltage is in the low level. For example, when the external supply voltage $V_{RD}$ is 15 V and the amplitude of the reset gate clock $\phi_{RS}$ is from 0 V to 3 V, the amplitude of the gate application pulse $\phi_{RS}'$ becomes 7 V to 10 V, and the source voltage $V_S$ of the source S1 of the transistor 101a becomes 13 V to 16 V.

Hereinafter, the function and effect of Example 1 will be described in detail.

FIG. 4 shows the voltage relationship among the external supply voltage $V_{RD}$, the reset gate clock $\phi_{RS}$, the gate application pulse $\phi_{RS}'$ and the source voltage $V_S$ of the source S1 of the transistor 101a.

In the initial state, $\phi_{RS}'=\phi_{RS}$, which indicates that the gate application pulse $\phi_{RS}'$ is a pulse having the same amplitude level as that of the reset gate clock $\phi_{RS}$. After the lapse of a predetermined time, the capacitor 53 is charged via the resistor 101b, allowing the drain reset voltage $V_{RD}$ (DC voltage component) to be added to the gate application pulse $\phi_{RS}'$.

The transistor 101a is connected between the signal terminal 50c to which the gate application pulse $\phi_{RS}'$ is applied and the signal terminal 50b to which the drain reset voltage $V_{RD}$ is applied. Therefore, when the gate application pulse $\phi_{RS}'$ becomes a high level, the potential at the signal terminal 50c is settled at a voltage at which the diode (transistor) 101a is turned on while the reset drain voltage $V_{RD}$ is being applied to the cathode thereof. In this state, if the resistance value of the resistor 101b is sufficiently greater than a resistance component of the external capacitor 53, the gate application pulse $\phi_{RS}'$ has the same amplitude as the reset gate clock $\phi_{RS}$.

More specifically, the gate application pulse $\phi_{RS}'$ is a value obtained by multiplying the pulse amplitude W of the reset gate clock $\phi_{RS}$ by the ratio of the resistance R of the resistor 101b to the sum of the resistance component of the external capacitor 53 and the resistance R, which is represented by:

Pulse amplitude of $\phi_{RS}'=W\times R/[R+1/(2\pi fC)]$ wherein C denotes the capacitance of the capacitor 53.

From the above, when $R>>1/(2\pi fC)$, the pulse amplitude of the gate application pulse $\phi_{RS}'$ is substantially the same as the pulse amplitude W of the reset gate clock $\phi_{RS}$. For example, when the pulse amplitude W of the reset gate clock $\phi_{RS}$ is 3 V, the capacitance C of the external capacitor 53 is about 50 pF, and the reset frequency f is about 10 MHz, $R>>300\Omega$ is established.

Since the resistor 101b has a comparatively high resistance, it can be formed of a thin diffusion layer formed on a substrate. It goes without saying that the resistor 101b may also be disposed as an external circuit outside the CCD chip.

The drain D1 of the voltage generation transistor 101a and the drain D2 of the reset transistor 52 are common with each other, and the device structure of the voltage generation transistor 101a is the same as that of the reset transistor 52. Accordingly, the channel potential at the voltage generation transistor 101a is equal to or greater than the reset drain voltage during the high level of the gate application pulse $\phi_{RS}'$, as in the reset transistor 52.

During the low level of the gate application pulse $\phi_{RS}'$, the channel potentials at the voltage generation transistor 101a and at the reset transistor 52 are smaller than those during the high level of the gate application pulse $\phi_{RS}'$ by a value corresponding to the amplitude of the gate application pulse $\phi_{RS}'$.

Since the voltage generation transistor 101a is fabricated by the same process as the reset transistor 52 and has the same construction as the reset transistor 52, if the channel potentials at the voltage generation transistor 101a and the reset transistor 52 are varied with respect to the gate application voltage due to a variation in fabrication process, these variations in channel potential at the two transistors are the same. Thus, the channel potentials at the transistors 101a and 52 are kept identical to each other irrespective of a variation in fabrication process.

Both the drain D1 of the transistor 101a and the drain D2 of the transistor 52 receive the external reset drain voltage $V_{RD}$. That is, the drain voltage is common for the two transistors. Accordingly, if the reset drain voltage $V_{RD}$ is varied, the channel potentials at the two transistors are varied by the same value. Thus, the voltage generation transistor 101a and the reset transistor 52 have the channel potentials of the same value in any state. The fact that the transistors have the same, channel potentials at any time means the following. If the channel potential of the reset transistor 52 is varied, a voltage which absorbs the variation in channel potential is generated by the voltage generation transistor 101a as the gate application voltage for the reset transistor 52, allowing for normal reset operation at any time.

Figure 10A:
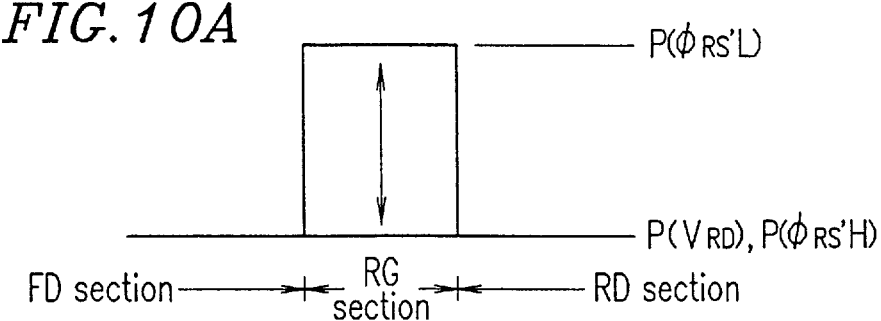
Figure 10B:
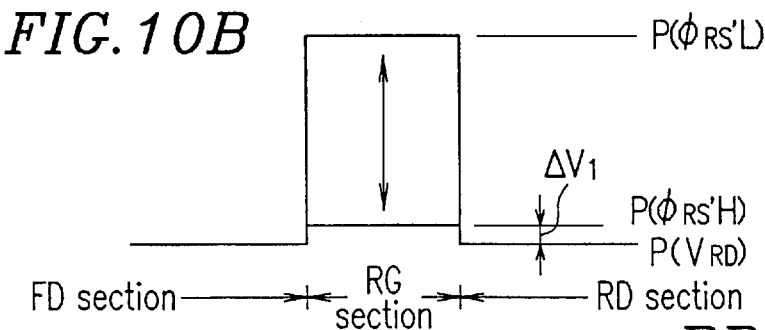
Figure 10C:
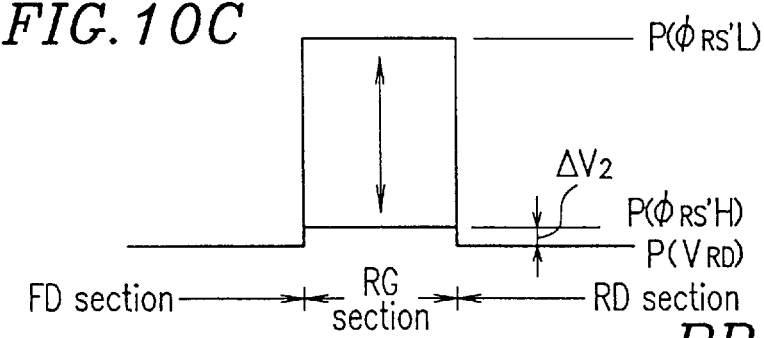
Figure 10D:
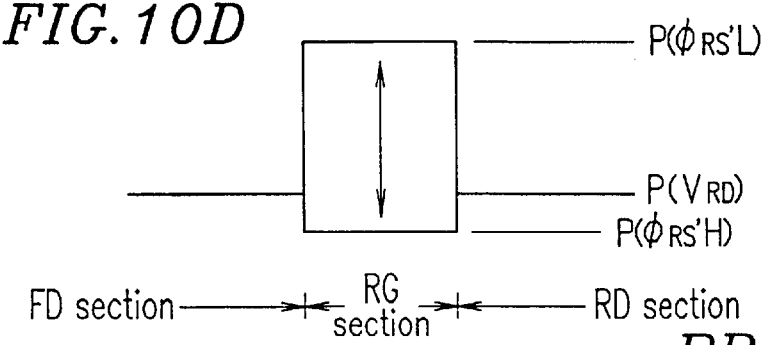
Figure 11A:
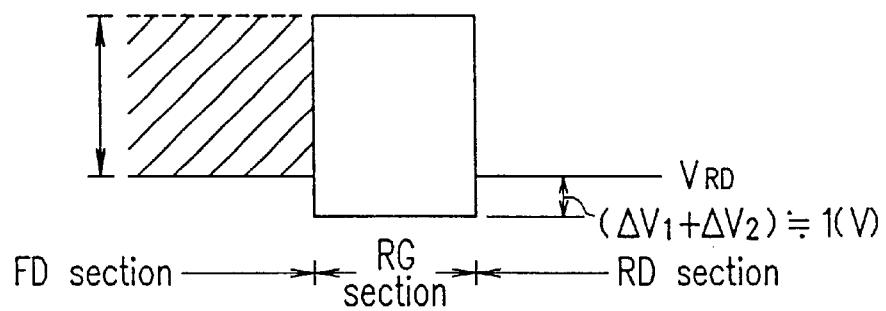
Figure 11B:
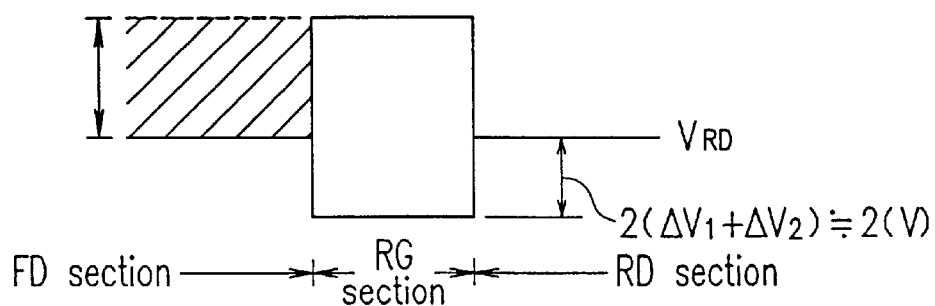
Figure 12:
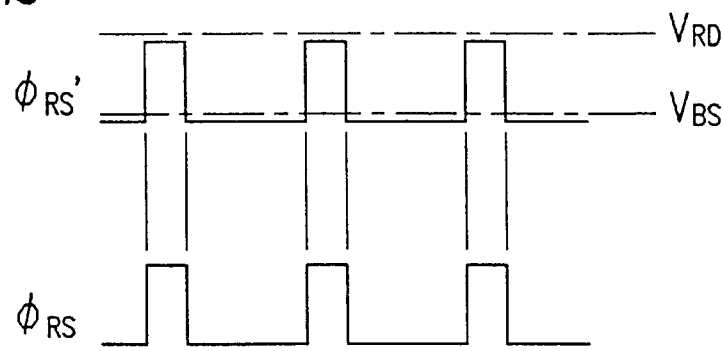
FIG. 12 is a view illustrating the voltage relationship between the externally supplied reset gate clock φ$_{RS}$ and the gate application pulse φ$_{RS}$' obtained by superimposing a DC bias voltage on the reset gate clock φ$_{RS}$, in comparison with each other.
Figure 13A:
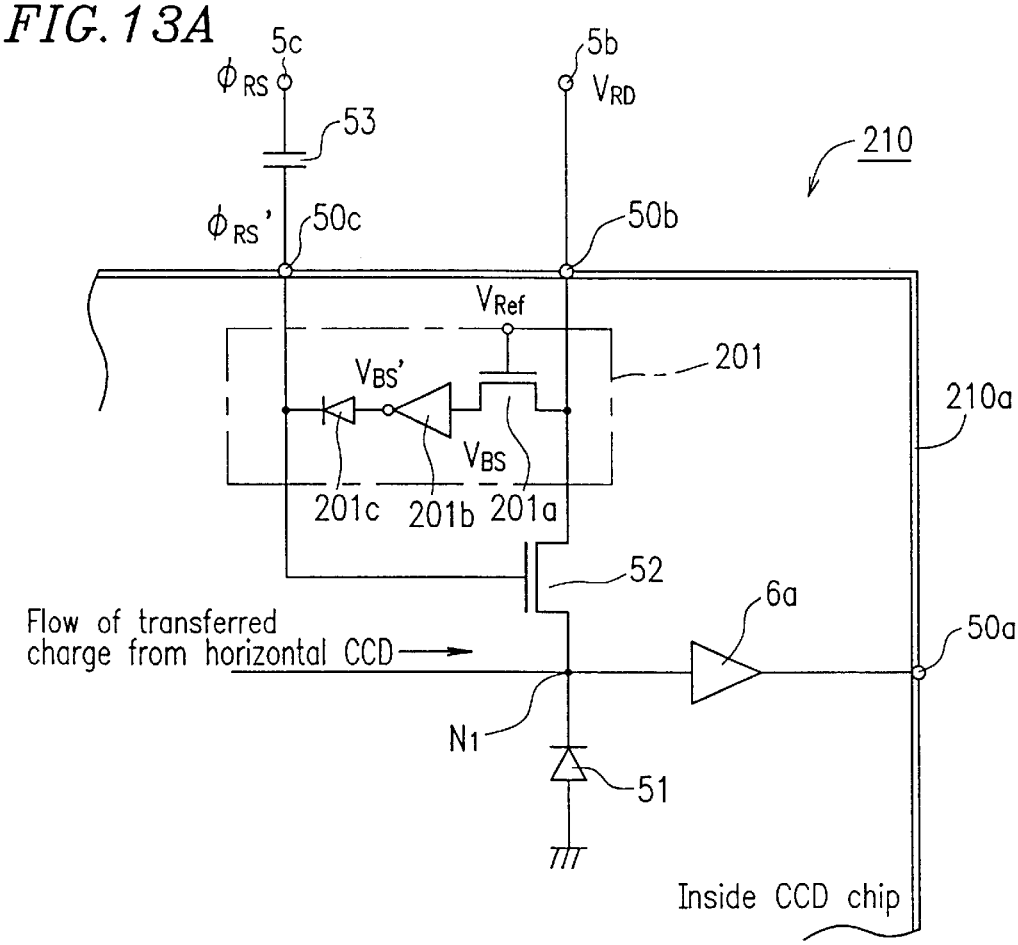
Figure 13B:
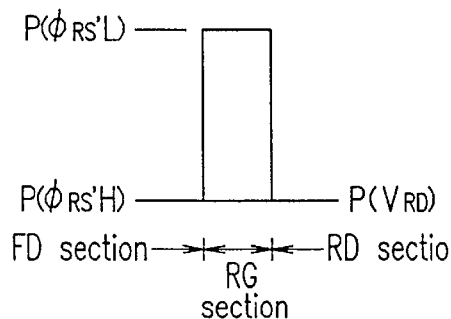
Figure 13C:
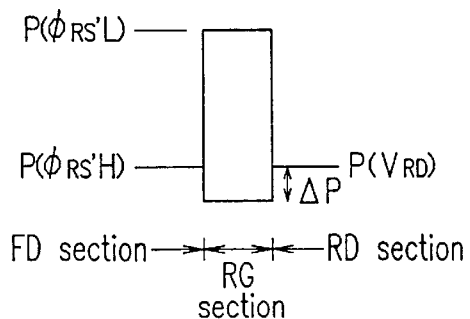
Figure 14A:
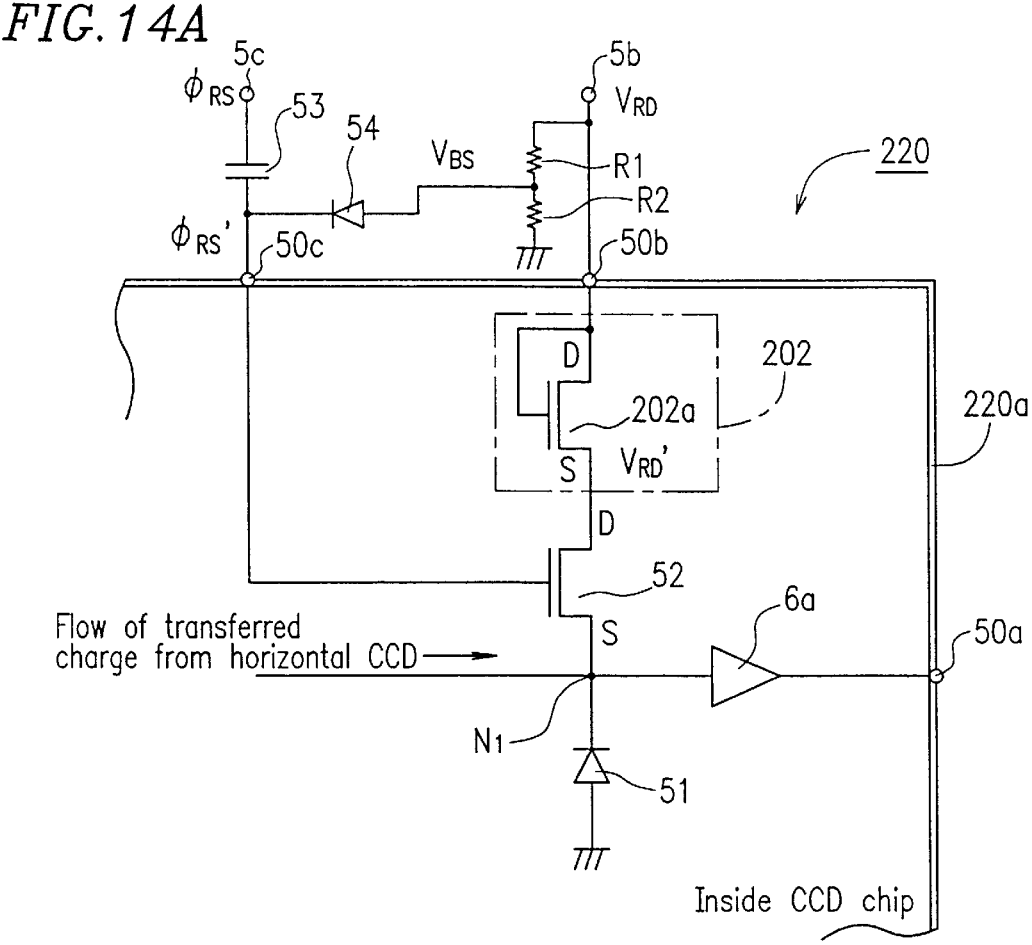
Figure 14B:
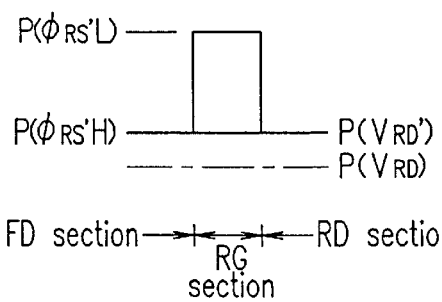
Figure 14C:
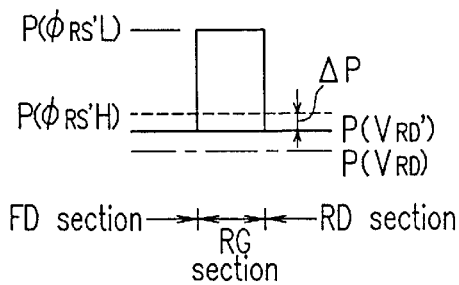
Figure 15:
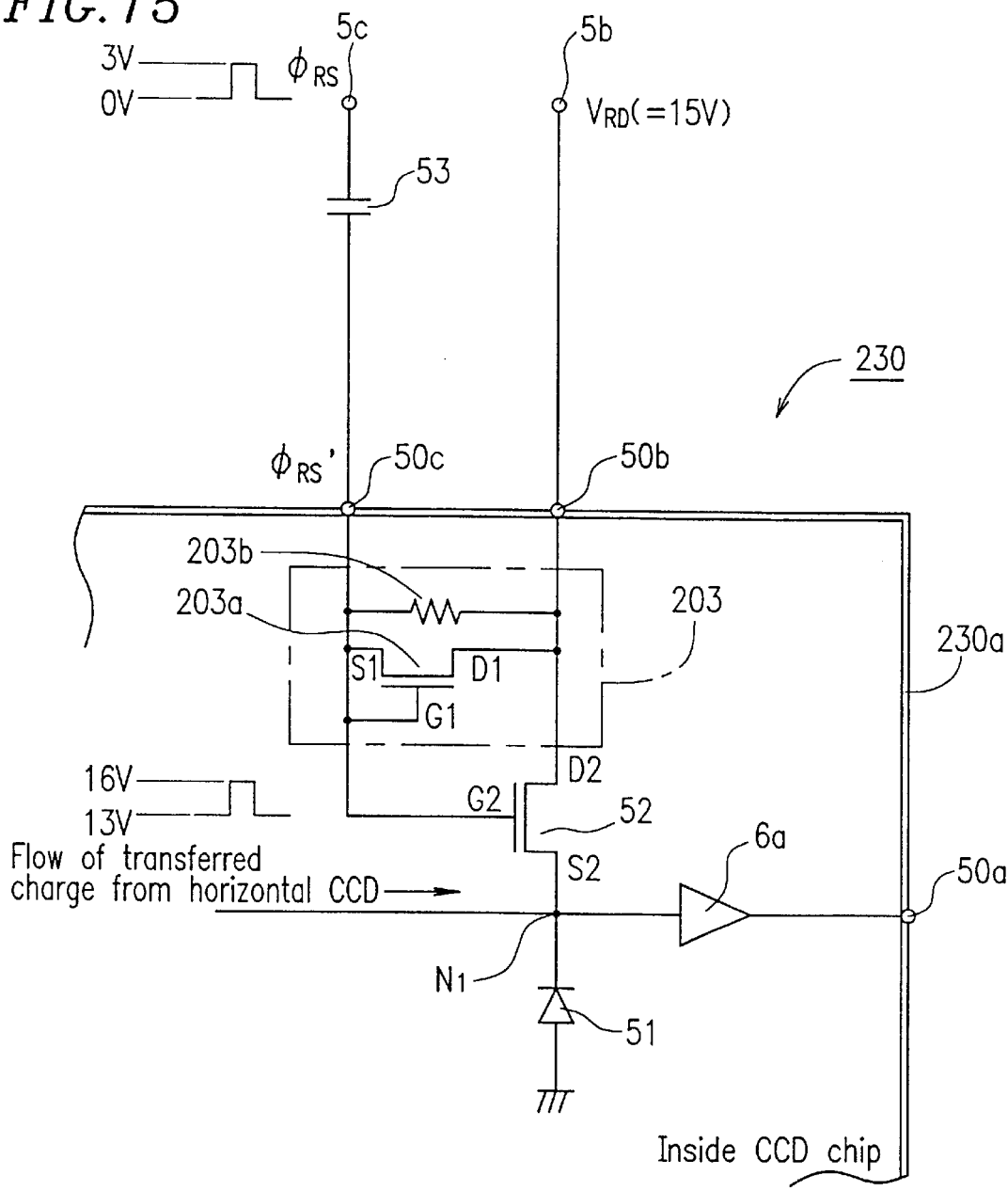
FIG. 15 is a view illustrating a construction of the conventional example 5.

As a result, the ideal state shown in FIG. 10A is realized. The pulse amplitude of the reset gate clock, which is conventionally required to be 5 V, can be reduced to about 3 V, and thus low voltage and low power consumption are realized. Moreover, the circuit for generating the DC bias voltage $V_{BS}$ to be superimposed on the reset pulse, which is conventionally required to be disposed outside the CCD chip, is not required. This realizes reduction in the number of peripheral components, and thus reduction in size, weight, and cost of the resultant apparatus.

Furthermore, unlike the conventional example 5 described above, the transistor used is not limited to one characterized in that the channel potential is lower than the gate voltage, but more general transistors can be used, allowing for a wider range of application.

EXAMPLE 2

Figure 5:
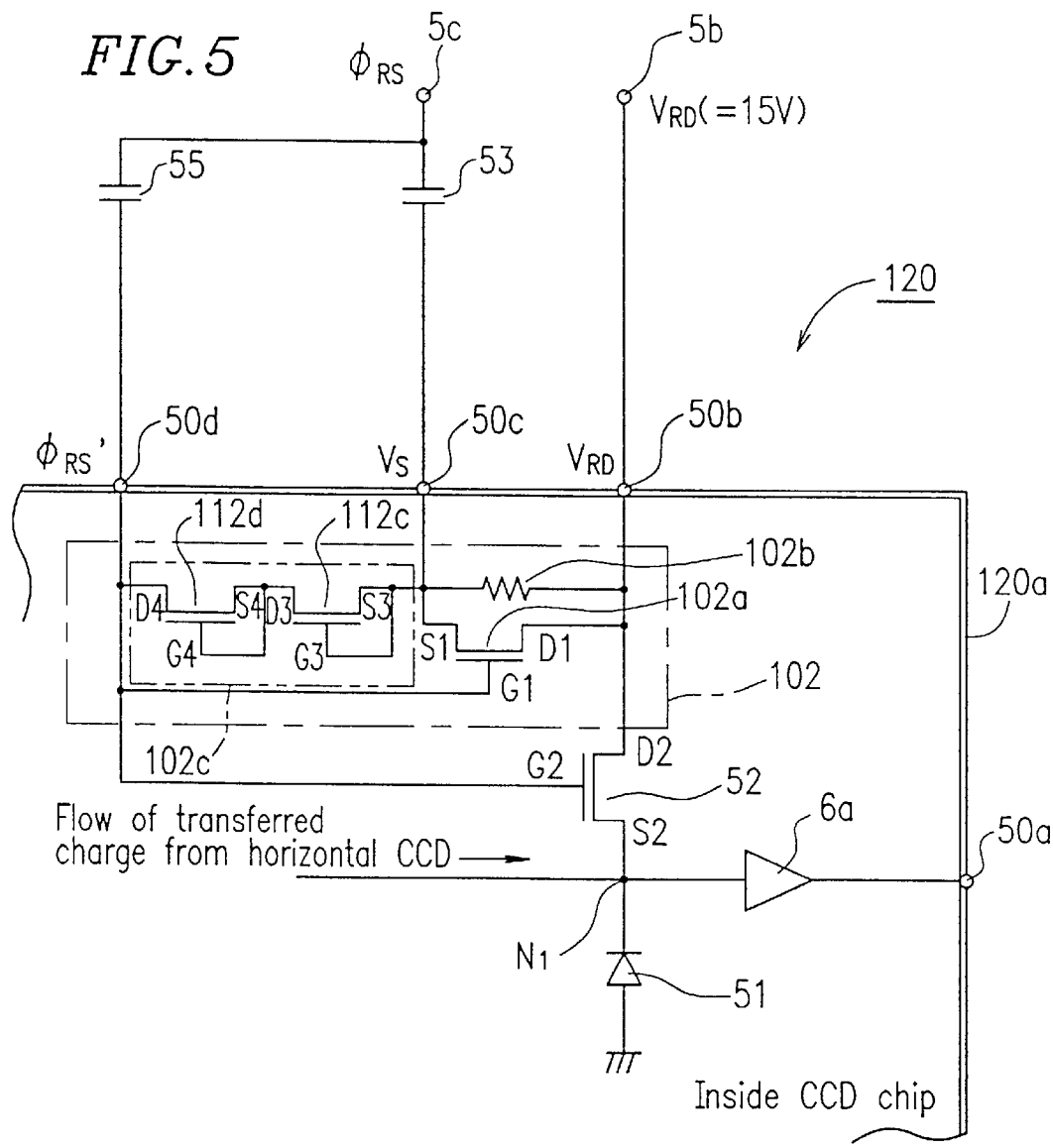
FIG. 5 is a view illustrating a construction of a solid-state imaging apparatus of Example 2 according to the present invention.

FIG. 5 illustrates a construction of a solid-state imaging apparatus of example 2 according to the present invention. Referring to FIG. 5, a solid-state imaging apparatus 120 of this example includes a pulse generation circuit 102 incorporated in a CCD chip 120a, in place of the pulse generation circuit 101 in Example 1 shown in FIG. 1. The other construction of the solid-state imaging apparatus 120 is the same as the solid-state imaging apparatus 110 of Example 1.

The voltage generation circuit 102 includes a voltage generation transistor 102a, a resistor 102b, and a voltage drop circuit 102c. A drain D1 of the voltage generation transistor 102a is connected to the drain D2 of the reset transistor 52. A source S1 and a gate G1 of the voltage generation transistor 102a are connected to respective terminals of the voltage drop circuit 102c. The gate G1 is also connected to the gate G2 of the reset transistor 52. The resistor 102b is connected between the drain D2 and the gate G2 of the reset transistor 52 via the voltage drop circuit 102c. The characteristics of the transistors 52 and 102a are not specifically limited. The voltage generation transistor 102a is fabricated in the same process as the reset transistor 52, and has the same device structure as the reset transistor 52.

The voltage drop circuit 102c includes voltage drop transistors 112c and 112d. A gate G3 and a source S3 of the voltage drop transistor 112c are connected to the signal terminal 50c in the state where the gate G3 and the source S3 thereof are short-circuited. A drain D3 of the voltage drop transistor 112c is connected to a source S4 of the voltage drop transistor 112d, while the source S4 is short-circuited with a gate G4 of the voltage drop transistor 112d. A drain D4 of the voltage drop transistor 112d is connected to a signal terminal 50d.

The voltage drop circuit 102c is not limited to the construction described above. Alternatively, other constructions, such as having three or more voltage drop transistors, may be adopted as long as a potential fall corresponding to the DC bias voltage can be provided.

The drain D1 of the voltage generation transistor 102a, the drain D2 of the reset transistor 52, and one terminal of the resistor 102b are connected to the signal terminal 50b. The source S1 of the voltage generation transistor 102a and the other terminal of the resistor 102b are connected to the signal terminal 50c. The gate G1 of the voltage generation transistor 102a and the gate G2 of the reset transistor 52 are connected to the signal terminal 50d.

The reset gate clock $\phi_{RS}$ is supplied from the signal terminal 5c to the signal terminal 50c via the capacitor 53 and to the signal terminal 50d via a capacitor 55. The reset drain voltage $V_{RD}$ is applied from the signal terminal 5b to the signal terminal 50b.

Figure 6:
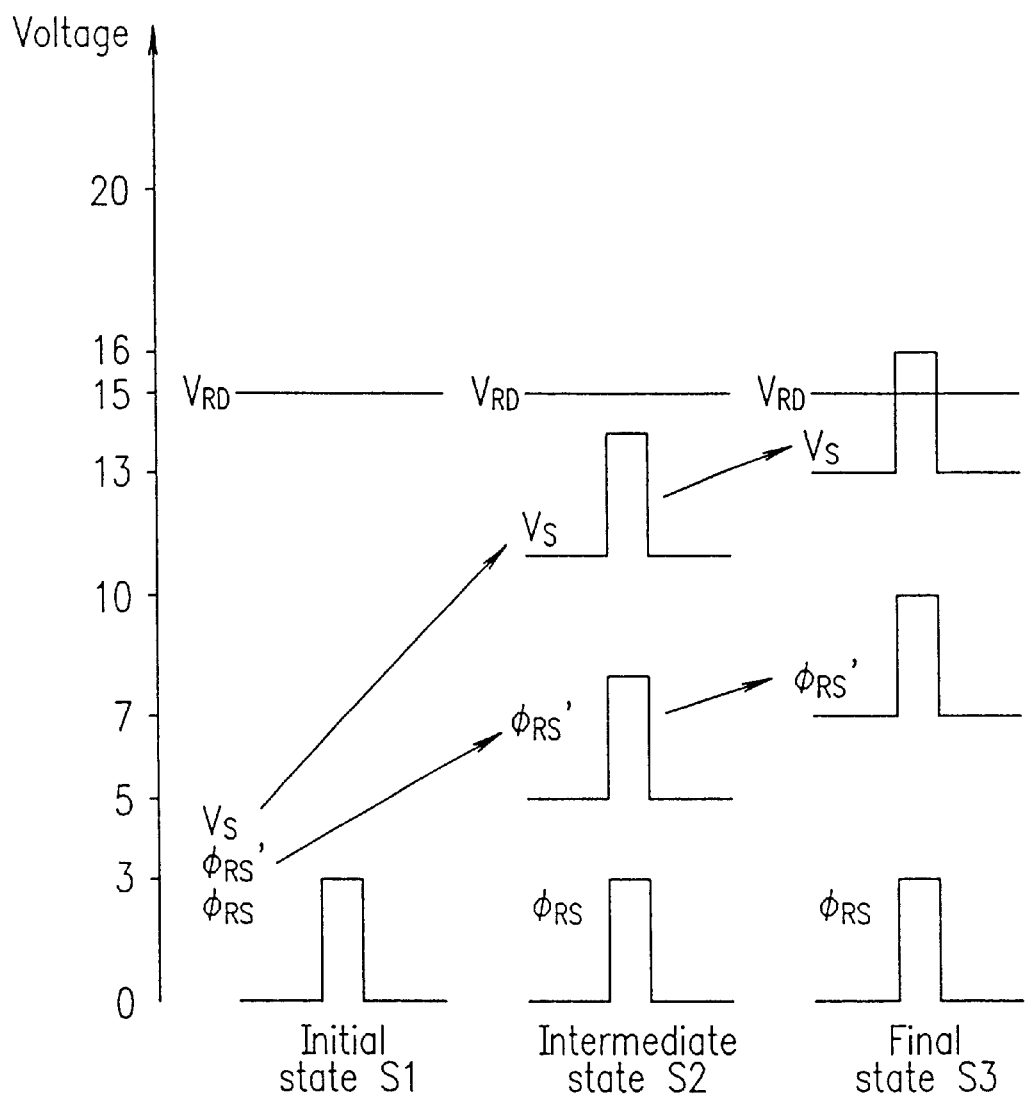
FIG. 6 is a view illustrating the voltage relationship among an external power voltage $V_{RD}$, a reset gate clock φ$_{RS}$, a gate application pulse φ$_{RS}$', and a DC bias voltage V$_S$ in the solid-state imaging apparatus of Example 2 according to the present invention.

In Example 2, the reset drain voltage $V_{RD}$ of 15 V, for example, is applied from the signal terminal 5b, and the capacitor 53 is charged with a potential of 13 V while the capacitor 55 is charged with a potential of 7 V (=13V–6V corresponding to voltage drop). The results are as shown in FIG. 6. That is, in an initial state S1, the amplitudes of the reset gate clock $\phi_{RS}$, the gate application pulse $\phi_{RS}'$, and the source voltage $V_S$ of the source S1 of the transistor 102a are 0 V to 3 V. In the final state S3 after the intermediate state S2, while the reset gate clock $\phi_{RS}$ is 0 V to 3 V, the gate application pulse $\phi_{RS}'$ becomes 7 V to 10 V, and the source voltage $V_S$ of the source S1 of the transistor 102a becomes 13 V to 16 V.

The solid-state imaging apparatus according to the present invention is not limited to those described in Examples 1 and 2. Alternatively, the voltage generation circuit may include any other holding circuit which can maintain the source potential at a level higher than the channel potential below the gate.

Thus, in the solid-state imaging apparatus according to the present invention, the voltage generation circuit for generating a discharge potential to be applied to the reset transistor includes a transistor which has the same construction as the reset transistor and is fabricated on the same substrate as the reset transistor. As a result, the two transistors have substantially the same characteristics, thereby reducing the influence of a variation component caused by the device characteristics.

The gate of the transistor constituting the voltage generation circuit is commonly connected with the gate of the reset transistor. Accordingly, the apparatus can be protected from an influence of a variation in the channel potential at the reset transistor due to fabrication process and a variation in an external power supply connected to the drain of the reset transistor.

Thus, by eliminating an unnecessary margin of the gate application voltage for the reset transistor, the amplitude of the gate application voltage can be reduced to realize low voltage application.

Moreover, by providing the holding circuit in the voltage generation circuit, the source potential at the transistor can be kept higher than the channel potential below the gate of the transistor. Thus, even when the channel potential at this transistor is higher than the gate potential, short-circuiting between the drain and the source of the transistor can be prevented. This eliminates the necessity of limiting the transistor constituting the voltage generation circuit to a specific one, but more general transistors can be used, allowing for a wider range of application.

In addition, since components such as an external DC voltage generation circuit and an inverted amplifier are not required, reduction in size, weight, and cost of the resultant apparatus can be realized.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A solid-state imaging apparatus comprising:

photodiodes having a photoelectric conversion function arranged on a substrate in one of a one-dimensional manner and a two-dimensional manner;

a charge transfer section for transferring a charge generated by photoelectric conversion in each of the photodiodes;

a charge accumulation section in a potential-floating state for accumulating the charges transferred from the charge transfer section;

a reset transistor having one terminal connected to the charge accumulation section and another terminal being applied with a discharge potential, for outputting the transferred charges; and a voltage generation circuit including a transistor having a same device structure as the reset transistor and fabricated on a same substrate as the reset transistor, a gate of the transistor constituting the voltage generation circuit being commonly connected with a gate of the reset transistor, the voltage generation circuit generating the discharge potential to be applied to the reset transistor, wherein the voltage generation circuit includes a holding circuit for holding a potential at a source of the transistor constituting the voltage generation circuit in a level higher than a channel potential below the gate of the transistor constituting the voltage generation circuit.

2. A solid-state imaging apparatus according to claim 1, wherein the holding circuit comprises a voltage source disposed between the gate and the source of the transistor constituting the voltage generation circuit.

3. A solid-state imaging apparatus according to claim 1, wherein the holding circuit comprises a voltage drop circuit including a plurality of transistors each having a gate and a source short-circuited therebetween, disposed between the gate and a source of the transistor constituting the voltage generation circuit.

* * * * *